United States Patent
Udischas et al.

(10) Patent No.: US 6,363,728 B1
(45) Date of Patent: Apr. 2, 2002

(54) SYSTEM AND METHOD FOR CONTROLLED DELIVERY OF LIQUEFIED GASES FROM A BULK SOURCE

(75) Inventors: Richard J. Udischas, Joliet; Benjamin J. Jurcik, Lisle; Hwa-Chi Wang, Naperville, all of IL (US); Robert G. Irwin, Concord, CA (US)

(73) Assignees: American Air Liquide Inc., Walnut Creek, CA (US); Air Liquide America Corporation, Houston, TX (US); L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/597,262

(22) Filed: Jun. 20, 2000

(51) Int. Cl.$^7$ .................................................. F17C 7/04
(52) U.S. Cl. ......................................................... 62/48.1
(58) Field of Search ................................ 62/48.1, 45.1, 62/48.3, 49.1

(56) References Cited

U.S. PATENT DOCUMENTS

| | | | | |
|---|---|---|---|---|
| 2,182,684 A | * | 12/1939 | Venable | 62/48.1 |
| 3,062,017 A | * | 11/1962 | Balcar et al. | 62/48.1 |
| 3,451,225 A | * | 6/1969 | Hill et al. | 62/48.1 |
| 3,564,861 A | * | 2/1971 | Andersen et al. | 62/48.1 |
| 3,628,347 A | * | 12/1971 | Puckett et al. | 62/208 |
| 4,593,529 A | * | 6/1986 | Birochik | 62/3.3 |
| 4,887,857 A | * | 12/1989 | VanOmmeren | 141/1 |
| 5,359,787 A | | 11/1994 | Mostowy, Jr. | 34/343 |
| 5,590,535 A | * | 1/1997 | Rhoades | 62/50.2 |
| 5,673,562 A | | 10/1997 | Friedt | 62/48.1 |

OTHER PUBLICATIONS

Bhadha et al, "Joule–Thomson Expansion and Corrosion in HCI Systems", *Solid State Technology*, Jul. 1992, pp 53–57.

* cited by examiner

*Primary Examiner*—William C. Doerrler
(74) *Attorney, Agent, or Firm*—Burns, Doane, Swecker & Mathis, LLP

(57) ABSTRACT

Provided is a novel system and method for delivery of gas from a liquefied state. The system includes (a) a delivery vessel holding a bulk quantity of liquefied gas therein; (b) a heat exchanger disposed on the delivery vessel to provide or remove energy from the liquefied gas only; and (c) a pressure controller for monitoring and adjusting the energy delivered to the vessel. The system and method allow for controlled delivery of liquefied gas from a delivery vessel at a predetermined flow rate. Particular applicability is found in the delivery of gases to semiconductor process tools.

20 Claims, 1 Drawing Sheet

SYSTEM AND METHOD FOR CONTROLLED DELIVERY OF LIQUEFIED GASES FROM A BULK SOURCE

BACKGROUND OF THE INVENTION

1. Field of the Invention

The present invention relates to a system and method for controlled delivery of a gas from a liquefied state. In particular, the invention relates to a system and method for delivery of a gas from a bulk source.

2. Description of Related Art

In the semiconductor manufacturing industry, high purity gases stored in bulk delivery vessels are supplied to process tools for carrying out various semiconductor fabrication processes. Examples of such processes include diffusion, chemical vapor deposition (CVD), etching, sputtering and ion implantation.

Of the numerous gases utilized in the semiconductor manufacturing processes, many are stored in bulk delivery vessels in a liquefied state. A partial list of chemicals stored in this manner, and the pressures under which they are typically stored, is provided below in Table 1:

TABLE 1

| Chemical Name | Formula | Vapor Pressure of Gas at 20° C. (psia) |
| --- | --- | --- |
| Ammonia | $NH_3$ | 129 |
| Boron Trichloride | $BCl_3$ | 19 |
| Carbon Dioxide | $CO_2$ | 845 |
| Dichlorosilane | $SiH_2Cl_2$ | 24 |
| Hydrogen Bromide | HBr | 335 |
| Hydrogen Chloride | HCl | 628 |
| Hydrogen Fluoride | HF | 16 |
| Nitrous Oxide | $N_2O$ | 760 |
| Perfluoropropane | $C_3F_8$ | 115 |
| Sulfur Hexafluoride | $SF_6$ | 335 |
| Tungsten Hexafluoride | $WF_6$ | 16 |

The primary purpose of the bulk delivery vessel and system is to store the above-listed electronic specialty gases (ESG) and provide a safe vehicle for delivering gas from the vessel to the process tool.

In the manufacture of integrated circuits it is imperative that the electronic specialty gases employed be delivered to the point of use in ultra-high purity form. Ultra-high purity is herein defined in terms of impurity concentrations of less than 100 ppb (parts per billion) for any volatile molecule, and in particular, particulate concentration of a size larger than 0.3 micrometers at less than 1/liter of gas under normal conditions and metallic impurities at less than 1 ppb (parts per billion in atomic units) per element.

In typical gas delivery systems, such as the one disclosed in U.S. Pat. No. 5,673,562 to Friedt, electronic specialty gases are conveyed to the point of use by application of the principle of evaporation thermodynamics. The gas contained in the bulk delivery vessel is maintained in a gas-liquid phase equilibrium and the ultra-pure vapor formed at the upper region of the vessel is conveyed to the point of use under the its own vapor pressure.

However, one of the difficulties associated with these type systems is maintaining the phase equilibrium properties necessary to deliver the gas phase at a desired flow rate. The temperature and pressure of the compressed gas-liquid system in the bulk delivery vessel changes due to the varying gas flow rate withdrawn from the vessel. This phenomenon arises from the fact that under practical conditions the heat of evaporation utilized is not compensated by external heat. In other words, the compressed gas-liquid system contained in the bulk vessel can cool down significantly, affecting the conditions of the gas-liquid phase equilibrium, and hence the flow rate of gas conveyed to the point of use.

Further, withdrawal of vapor phase ESG at a high flow rate may entrain liquid droplets of the gas, thereby having a deleterious effect on the process and apparatus. For example, in the case of HCl, condensation occurs by the Joule-Thompson effect (see, Joule-Thompson Expansion and Corrosion in HCl System, Solid State Technology, Jul. 1992, pp. 53–57). Liquid HCl is more corrosive than its vapor form. Likewise, for the majority of chemicals listed above in Table 1, the liquid forms thereof are more corrosive than their respective vapor forms. Thus, condensation of these materials in the gas delivery system can lead to corrosion, which is harmful to the components of the gas delivery system. Moreover, the corrosion products can lead to contamination of the highly pure process gases. This contamination can have deleterious effects on the processes being run, and ultimately on the manufactured semiconductor devices.

The presence of liquid in the gas delivery system has also been determined to lead to inaccuracies in flow control. That is, the accumulation of liquid in various flow control devices can cause flow rate and pressure control problems as well as component failure, leading to misprocessing. One example of such behavior is the swelling of a valve seat by liquid chlorine, which causes the valve to become permanently closed. Such failure can necessitate shutdown of the process during replacement of the failed parts and subsequent leak checking. Extensive process downtime can result.

Thus, to meet the requirements of the semiconductor processing industry and to overcome the disadvantages of the related art, it is an object of the present invention to provide a novel system for controlled delivery of gases from a liquefied state which allows for accurate control of the flow rate.

It is a further object of the present invention to provide a method for delivery of gases from a bulk delivery vessel at a variable flow rate in a controlled manner.

It is another object of the present invention to provide a system wherein pressure controls are employed to monitor and adjust the energy input delivered to the bulk source vessel.

It is yet another object of the present invention to provide a system having an energy transfer device disposed to concentrate the energy to an area where it is needed.

Other objects and aspects of the present invention will become apparent to one of ordinary skill in the art upon review of the specification, drawings and claims appended hereto.

BRIEF DESCRIPTION OF THE DRAWINGS

The objects and advantages of the invention will become apparent from the following detailed description of the preferred embodiments thereof in connection with the accompanying drawing, in which:

The FIGURE of the Drawing is a schematic diagram of a system for delivery of a gas from a liquefied state in accordance the invention.

SUMMARY OF THE INVENTION

Figure 1:
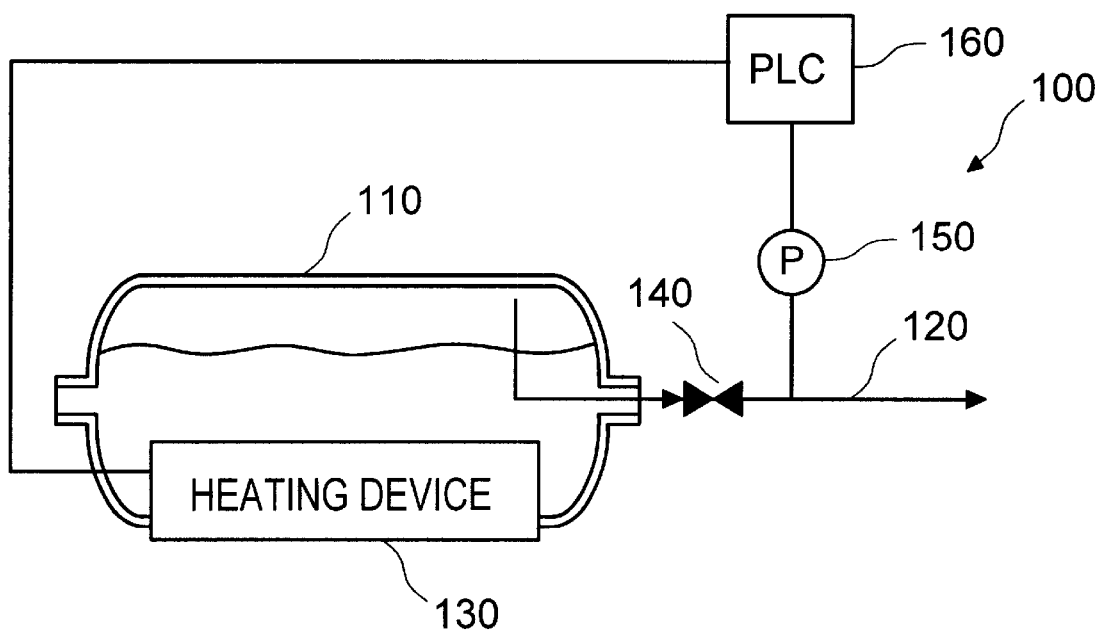

In accordance with the inventive system, vapor phase gas can be withdrawn from a bulk delivery vessel at a desired flow rate by maintaining and controlling the energy input to the vessel via pressure measurement and controls. In addition, since the temperature outside the bulk vessel is not representative of the conditions of the product to be distributed therefrom, energy transfer means are provided in an area that holds liquid phase gas. Thus, temperature stabilization is attained in a fast and facile manner. As used herein"bulk" means any vessel having capacity greater that standard cylinders (about 20 liters).

According to one aspect of the invention a system for delivery of a gas from a liquefied state is provided. The system includes: (a) a delivery vessel holding a bulk quantity of liquefied gas therein; (b) a heat exchanger disposed on the delivery vessel to provide or remove energy from the liquefied gas only; and (c) a pressure controller for monitoring pressure and adjusting the energy delivered to the liquefied gas. Preferably, the controller monitors the pressure to derive the temperature in the delivery vessel and adjusts the energy exchange therein.

According to another aspect of the invention, a method for delivery of gas from a liquefied state in a controlled manner is provided. The method includes: (a) providing a delivery vessel holding a bulk quantity of liquefied gas therein; (b) supplying energy in a pressure controlled manner to the bulk delivery vessel via a heat exchanger; and (c) delivering the liquefied gas at a controlled flow rate from the vessel to a point of use.

DETAILED DESCRIPTION OF THE PREFERRED EMBODIMENTS OF THE INVENTION

The invention provides for maintaining controlled conditions of the gas-liquid phase equilibrium in order to deliver gases from a delivery vessel holding a bulk quantity of the gas in liquefied state at a desired flow rate.

The invention will be described with reference to the FIGURE of the Drawing, which illustrates a schematic system 100 for delivery of a gas from a bulk source in accordance with one exemplary aspect of the invention. It is noted, however, that specific configurations will generally depend on factors such as cost, safety requirements and the like.

A chemical, such as a liquefied electronic specialty gas (ESG), is stored in bulk vessel 110 under its own vapor pressure. The bulk vessel can be constructed from a material such as type 304 and 316 stainless steel, Hastelloy, nickel or a coated metal (e.g., a zirconium-coated carbon) which is strictly non-reactive with the ESG and can withstand both a vacuum and high pressures. The specific material contained within the bulk vessel is not limited, but is process dependent. Typical materials include these specified in Tables 1, e.g., $NH_3$, $BCl_3$, $CO_2$, $SiH_2Cl_2$, HBr, HCl, HF, $N_2O$, $C_3F_8$, $SF_6$ and $WF_6$.

Typically, bulk vessel 110 is delivered to the site in full. Alternatively, bulk vessel 110 is filled on-site. There it is purged prior to introduction of ESG by alternating vacuum-high pressure cycles of high purity inert gases. Preferably the bulk vessel is heated to a temperature ranging from about 80°–120° C., and can withstand both vacuum and pressures of up to 100 bar employed during the purge process.

The ESG is transfilled to bulk vessel in either gaseous or liquid phase. The transfilling affords another measure of purification of the ESG prior to its introduction into bulk vessel 110. The transfer is preferably assisted by cooling the bulk vessel at cryogenic temperature using, if necessary, external and/or internal heat exchangers.

The bulk vessel is installed"on-site," that is in close proximity to the semiconductor manufacturing facility where the outside temperature can be as low as −30° C., or inside the facility, from where the ESG is delivered in a safe and facile manner to the point of use. The facility is preferably equipped with automatic gas sensors and an emergency abatement system in case of an accidental leakage or other malfunctions of the system.

Vessel 110 is connected to the point of use, such as a semiconductor processing tool, through conduit 120. While initially in equilibrium condition, the liquid-vapor phase thermodynamic equilibrium is imbalanced in bulk vessel 110 as the gas is delivered to the point of use under its vapor pressure. Transfer of energy from the ambient, thus occurs when the gas is withdrawn at a high flow rate or the temperature is low to facilitate delivery of gas to a point of use. In order to move back to equilibrium, energy is transferred from bulk vessel 110 to the environment, reducing the temperature of the liquid and vapor, and the vapor withdrawn and delivered from vessel 110 may have a minimal amount of liquid droplets entrained therein. Naturally, conduit 120 is preferably fabricated from a corrosion resistant material as described above in connection with bulk vessel 110.

In order to maintain the bulk vessel's temperature and pressure heat must be transferred to the liquid bulk vessel 110. The balance of the rate of heat transfer to bulk vessel 110, the energy requirements specified by the flow rate and the thermal mass of bulk vessel 110. The rate of heat transfer between the ambient and bulk vessel 110 is governed by: (1) the overall heat transfer coefficient; (2) the surface area available for heat transfer; and (3) the temperature difference between the ambient and the contents of bulk vessel 110. The method of calculating the rate of heat transfer is further explained in U.S. Pat. No. 5,761,911 and U.S. Pat. No. 6,076,349, which are incorporated herein by reference in their entirety.

Increasing the energy input to the bulk vessel in turn increases the heat transfer rate. It is, therefore, undesirable to withdraw material from bulk vessel 110 with too large of a temperature difference between the surface of the bulk vessel and the ambient (and by analogy, between the liquid stored and the bulk vessel) due to the possible entrainment of liquid droplets in the gas withdrawn from the bulk vessel, resulting from different boiling phenomena. As the temperature difference between the bulk vessel and the liquid increases, the evaporation process changes from one of interface evaporation to a bubbling type of phenomena.

The combination of three mechanisms responsible for the presence of a liquid phase in the flowing gas (i.e. impurities in droplets entrained in the vapor withdrawn from the bulk vessel; formation during expansion in the first component downstream of the bulk vessel; and the purging of droplets existing during the startup of flow), effectively limits the flow rate of gas that can be reliably supplied by an individual bulk vessel. It has been determined that elimination of these liquid droplets in the process gases and maintaining the temperature and/or pressure of the bulk vessels within a predetermined range will allow greater continuity in the flow rate provided.

In the exemplified embodiment, vapor phase ESG is withdrawn from bulk vessel 110 at a variable rate and in a controlled manner. The vapor phase is withdrawn from or near the top of bulk vessel 110 and gas in liquid state remains in the vessel. Thus, the gas within the bulk vessel is maintained in a compressed state during operation and the vapor withdrawn therefrom has a low concentration of impurities due to the lack of entrainment of liquid droplets in the vapor delivered.

As the vapor is withdrawn from bulk vessel 110 at an increasing rate; the pressure in bulk vessel 110 and conduit 120 decreases, thereby in effect decreasing the ability to maintain the flow rate at which semiconductor tool(s) demand. To maintain the desired flow rate of vapor delivered a pressure control for energy input to bulk vessel 110 is utilized. The source of energy is a heat exchanger 130 having either a liquid transfer media circulating in a metallic coil, or by electrical heating using a heater embedded in a metallic coil, such as the ones available under the trade designation THERMOCOAX®. The metallic coiling is made of a corrosion resistant material, such as the ones discussed above, for the specific ESG considered. In the case where a liquid provides the energy, the liquid heat transfer medium is selected not only for its thermal properties but also safety concerns in the case of accidental leaks in system 100. Suitable energy sources are further described in U.S. Pat. No. 5,673,562 and hereby incorporated by reference in its entirety.

Heat exchanger 130, is preferably positioned at or near a bottom portion of bulk vessel 110, and even more preferably at the lower one quarter of the bulk vessel, to ensure that the energy transfer occurs in an area where there is ESG contained in liquid form. Thus, the pressure of bulk vessel 110 is regulated is such a way that liquid in the bulk vessel is within approximately 5° C. of room temperature. Efficient energy input occurs as a result of the heat exchanger being in close proximity to liquid form ESG.

During operation, ESG vapor is demanded by a semiconductor tool or tools causing a flow control valve 140 to open. Vaporized ESG exits bulk vessel 110 and flows through conduit 120, which has a flow control valve 140. Depending on the type of ESG employed the operating pressure within the bulk vessel ranges from about 2 to about 100 bar, and is preferably maintained from 6 to 60 bar. However, to ensure withdrawal of vapor phase ESG at a demanded flow rate, a pressure sensor 150, such as a transducer is disposed downstream of vessel 110 in conduit 120.

Delivery system 100 includes a closed-loop control means to monitor the pressure at which the ESG is withdrawn through conduit 130 and to compensate for the energy of vaporization utilized to deliver the ESG at a desired flow rate. Suitable control means are known in the art, and include, for example, a programmable logic controller (PLC) or microprocessor 160.

In the exemplified embodiment, pressure sensor 150 sends a measurement signal to controller 160 thereby indicating the pressure of the vapor phase ESG in conduit 120. An algorithm is employed to determine the temperature of the liquid phase ESG in bulk vessel based on the measured pressure in conjunction with the pressure vs. temperature curve of the particular ESG employed. Upon deriving the temperature, it is compared with a temperature set point range. In the event that the temperature falls below the lower limit of the range, energy in the form of heat is applied. Conversely, if the temperature is above the range energy is removed by the heat exchanger.

Alternatively, the measured pressure is compared to a pressure set point range for the acceptable temperature. Should the pressure decrease below the expected pressure at ambient temperature, for example, a signal is transmitted from controller 160 to heat exchanger 130 to deliver energy to bulk vessel 110. Thus, the thermal energy is employed to restore the pressure necessary to maintain demanded flow rate of vapor delivered to the point of use.

While the invention has been described in detail with reference to a specific embodiment thereof, it will become apparent to one skilled in the art that various changes and modifications can be made, and equivalents employed without departing from the scope of the claims.

What is claimed is:

1. A system for delivery of a gas from a liquefied state, the system comprising:
   (a) a delivery vessel holding a bulk quantity of liquefied electronic specialty gas therein;
   (b) a heat exchanger disposed on said delivery vessel to provide or remove energy from the liquefied gas;
   (c) a pressure controller for monitoring pressure and adjusting the energy delivered to said liquefied electronic specialty gas, wherein said pressure controller is a programmable logic controller or a microprocessor; and said pressure controller further employs an algorithm to determine the temperature of the liquid phase gas in said delivery vessel based on the measured pressure in conjunction with the pressure/temperature curve of the particular electronic specialty gas utilized.

2. The system for delivery of gas according to claim 1, further comprising a conduit having a first end connected to said delivery vessel and a second end disposed to deliver said liquefied gas, substantially in gaseous form, to a point of use.

3. The system for delivery of gas according to claim 2, further comprising a pressure sensor connected to said conduit and/or said vessel.

4. The system for delivery of gas according to claim 2, wherein said pressure sensor measures the pressure of the liquefied gas and sends a signal to said controller.

5. The system for delivery of gas according to claim 4, wherein said controller derives the temperature of liquefied gas in said vessel, and based on an acceptable temperature range programmed into said controller activates said heat exchanger.

6. The system for delivery of gas according to claim 1, wherein said heat exchanger is disposed on a lower portion of the vessel in proximate location to said liquefied gas.

7. The system for delivery of gas according to claim 6, wherein said heat exchanger is disposed on the lower one quarter portion of said vessel.

8. The system for delivery of gas according to claim 1, wherein said delivery vessel is located inside a processing plant or outside thereof and connected to said plant.

9. The system for delivery of gas according to claim 2, further comprising a valve in said conduit to control the delivery of liquefied gas to the point of use.

10. A method for delivery of gas from a liquefied state in a controlled manner, the method comprising:
    (a) providing a delivery vessel holding a bulk quantity of liquefied gas therein;
    (b) supplying or removing energy in a pressure controlled manner from said delivery vessel via a heat exchanger; and
    (c) delivering said liquefied gas at a controlled flow rate from said vessel to a point of use.

11. The method for delivery of gas according to claim 10, further comprising:
    providing a controller and setting a high and a low pressure point based on the gas employed to control the flow rate thereof.

12. The method for delivery of gas according to claim 11, further comprising:

sending a signal from said controller to said heat exchanger to supply energy to said delivery vessel when pressure decrease below the set pressure at ambient temperature.

13. The method for delivery of gas according to claim 10, wherein said liquefied gas is delivered to a point of use in a substantially gaseous state.

14. The method for delivery of gas according to claim 10, further comprising:

providing a controller and setting a high and a low temperature point based on the gas employed to control the flow rate thereof.

15. The method for delivery of gas according to claim 14, further comprising:

measuring the pressure of liquefied gas being delivered to the point of use and sending a signal to said controller where an algorithm is utilized to derive the temperature of said liquefied gas.

16. The method for delivery of gas according to claim 15, further comprising:

sending a signal from said controller to said heat exchanger to supply energy to said delivery vessel when the temperature of the liquefied gas is below the set temperature for a particular gas.

17. The method for delivery of gas according to claim 15, further comprising:

sending a signal from said controller to said heat exchanger to remove energy from said delivery vessel when the temperature of the liquefied gas is above the set temperature for a particular gas.

18. The method for delivery of gas according to claim 10, wherein said energy is supplied to a lower portion of said vessel.

19. The method for delivery of gas according to claim 17, wherein said energy is supplied to the lower one quarter portion of said vessel where the gas is in liquid form.

20. The method for delivery of gas in accordance with claim 10, wherein the gas is selected from the group consisting of $NH_3$, $BCl_3$, $CO_2$, $SiH_2Cl_2$, HBr, HCl, HF, $N_2O$, $C_3F_8$, $SF_6$ and $WF_6$.

* * * * *